Figure 1:
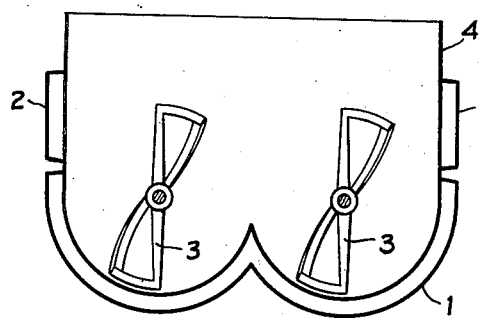
Figure 2:
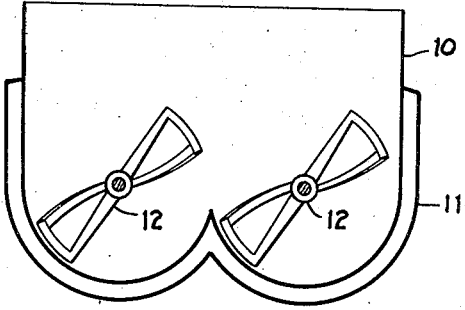
Figure 3:
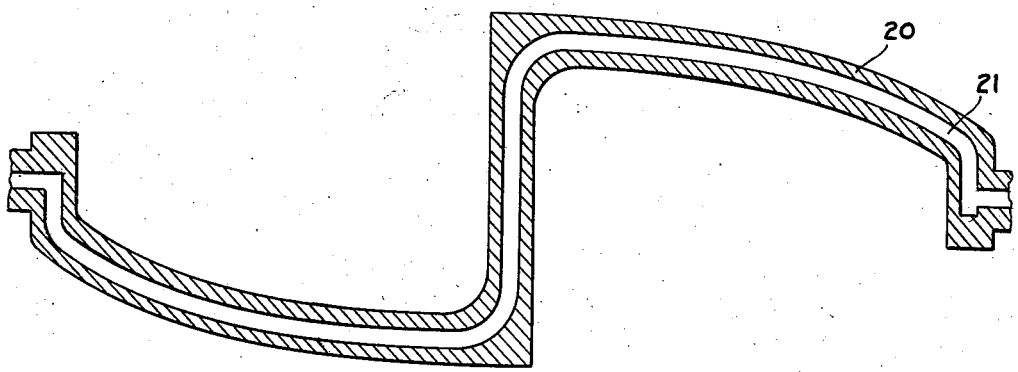

Sept. 12, 1950   W. B. HINCKE ET AL   2,521,916
MANUFACTURE OF ORGANIC ACID ESTERS OF CELLULOSE
Filed Nov. 23, 1946

WILLIAM B. HINCKE
CARL J. MALM
INVENTORS

Patented Sept. 12, 1950

2,521,916

UNITED STATES PATENT OFFICE 2,521,916

MANUFACTURE OF ORGANIC ACID ESTERS OF CELLULOSE

William B. Hincke, Kingsport, Tenn., and Carl J. Malm, Rochester, N. Y., assignors to Eastman Kodak Company, Rochester, N. Y., a corporation of New Jersey Application November 23, 1946, Serial No. 711,944

9 Claims. (Cl. 260—227)

This invention relates to a method of preparing organic acid esters of cellulose in which cooled mixer blades are employed.

In the manufacture of organic acid esters of cellulose the cellulose in the form of refined cotton linters or refined chemical woodpulp is acted upon with a lower fatty acid anhydride and an acetylation catalyst in an esterification mixer. The commonly accepted apparatus for the manufacture of these esters is a Werner-Pfleiderer type mixer having therein two sigma-shaped blades which, upon rotation, thoroughly mix the cellulose and the esterifying reagents.

The reaction between cellulose and a lower fatty acid anhydride is highly exothermic. As a high degree of heat degrades the cellulose or severely lowers its viscosity, it has been usually necessary in cellulose esterification processes to control the degree of heat generated in the system, such as by restricting the rate of reaction (by use of a small proportion of catalyst) and cooling the mass during the course of the reaction. The Werner-Pfleiderer type acetylation mixers employed have almost invariably been provided with jackets for the circulation of water or other cooling liquid therein during at least the most intensive part of the esterification. By this means temperature rise beyond the desired maximum has been retarded.

In acetylation processes, however, it has been commonly recognized that to control the temperature of the system it has usually been necessary to restrict the size of the batches, such as to the esterification of 100 or 200 lb. lots of cellulose, although in some cases by ingenious procedures larger batches of good quality have been prepared, particularly where the proportion of catalyst has been restricted so as to avoid a too rapid reaction.

One object of our invention is to provide a process for esterifying cellulose permitting the use of larger size batches than ordinarily used heretofore. Another object of our invention is to provide a process of esterifying cellulose in which a less time cycle, more uniform esterification, better clarity of product and less degradation are obtained than with cellulose esterification processes heretofore employed. A further object of our invention is to provide a cellulose esterification process in which the control of temperature is much less difficult than in previous processes in which the only cooling was by means of jackets. Other objects of our invention will appear herein.

We have found that cellulose esterifications of large batch size (such as 600–1000 lbs. of cellulose) but readily controlled and of short duration may be carried out by employing a Werner-Pfleiderer type mixer in which the mixing blades are cooled and in which process the packet temperatures are so controlled that the mass does not adhere to the walls of the mixer. We have found that by this procedure larger catalyst proportions (such as 10–15% sulfuric acid, based on the cellulose) may be employed than have been previously permissible in the preparation of cellulose esters of good viscosity.

In its broadest aspects our invention comprises the esterification of cellulose in a mixer in which the mixing blades are cooled. In its most desirable form, however, our invention contemplates the esterification of cellulose in a jacketed mixer using cooled mixer blades and the warming of at least that portion of the walls of the mixer to which the esterification mass would otherwise adhere when the cellulose ester starts to go into solution.

In the preparation of cellulose acetate or other lower fatty acid esters of cellulose, ordinarily the cellulose is mixed with acetic or other lower fatty acid anhydride, a solvent such as acetic acid, and a catalyst, such as sulfuric acid, and after a time the cellulose esterifies and dissolves in the liquid reagents forming a viscous mass. The better quality (or higher viscosity) cellulose acetates result when the temperature of the esterification is kept down and the resulting masses are of greater viscosity than those in which a high temperature is employed. For the preparation of high viscosity esters the maximum temperature is ordinarily 80–90° F., while with medium viscosity esters the temperature may be allowed to rise to 100–110° F. If low viscosity esters are desired, a maximum temperature as high as 130° F. may be permitted. In these processes it has been noted that due to the cooling effect of the mixer jacket upon the dope sticking of the viscous mass to the sides of the esterification vessel not wiped by the mixer blades occurs. This leads to non-uniformity of product and is avoided by imparting to those sides a temperature equal to or above that of the esterification dope.

The attached drawings illustrate apparatus useful in carrying out esterifications in accordance with our invention.

Figure I is a sectional view of a Werner-Pfleiderer type acetylation mixer with a split jacket arrangement.

Figure II is a sectional view of a Werner-Pfleiderer type mixer with a unitary jacket.

Figure III is a view in section of one of the cooled sigma-shaped blades employed in the mixer.

In Figure I the mixer 4 is provided with blades, 3, of the type illustrated in Figure III and with a water jacket consisting of parts 1 and 2. Jacket portion 2 is provided exterior of the walls to which the adherence of acetylation dope may occur.

Figure II illustrates the ordinary type of Werner-Pfleiderer acetylation mixer except that it is provided with cooled mixing blades, 12, of the type illustrated in Example III. The mixing vessel, 10, is also provided with water jacket 11, so as to cool the walls of the mixer with which the esterification dope contacts.

Figure III illustrates a sigma-shaped mixing blade, 20, having a water-tight pipe, 21 (both preferably of stainless steel), through its entire length for the passing of water or some other cooling liquid therethrough.

Referring to Figure I, esterifications in accordance with our invention are desirably carried out therein by first mixing together cellulose and the esterifying liquid, ordinarily consisting of lower fatty acid anhydride, lower fatty acid and sulfuric acid catalyst, therein while running cooling liquid through both the mixer blades and the cooling jackets, 1 and 2. The temperature of the cooling liquid to be used ordinarily depends somewhat on the size of the batch, the viscosity type ester desired and the ratio of the cooling surface to the esterification mass. Ordinarily brine or other cooling liquid at a temperature of 20-40° F. is used, but a temperature ranging down to as low as 0° F. may be employed. After the esterification has proceeded to the point where the cellulose starts going into solution, water or other liquid having a temperature of 80-135° F. is then passed through the jacket, 2, of Figure I and this is continued until the esterification is completed. It is preferable that this water approximate the temperature of the esterification dope. Meanwhile, either the circulation of the cooling liquids may be continued in jacket 1, warm water may be passed therethrough, or the passing of liquid may be discontinued therein. The cooling of the mixer blades is continued.

If the esterification is carried out in apparatus of the type pictured in Figure II, the esterification is run with the cooling liquid passing through the mixer blades and the water jacket. After the cellulose starts going into solution, the cool liquid in the jacket is replaced by water having a temperature of 80-130° F. which is circulated therethrough until the esterification is completed. Ordinarily, this point is about ⅔ of the way through the esterification although this varies with different rates of reaction. As the apparatus of Figure I is most effective, that apparatus permits of the use of larger size batches than the apparatus of Figure II, which in turn permits of larger size batches than does ordinary cellulose esterification apparatus which does not have cooled mixer blades.

Included within the scope of our invention are processes:

1. In which cooling by the cold liquid running through the mixer blades is utilized for holding down the temperature of the reaction mass, with or without other cooling.

2. In which cooling both by the cooled mixer blades and the jacket of the esterification vessel is utilized to control the temperature of the reaction mass, particularly where the vessel is so built that sticking to the sides does not occur.

3. In which a vessel as illustrated by Figure I is used, the lower jacket and mixer blades being cooled and the upper jacket having warm water circulated therein.

4. In which a vessel as illustrated by Figure II is employed, cooling initially being by both the mixer blades and the jackets, and in the latter part of the process only by the mixer blade.

One of the advantages of processes in accordance with our invention is that without decreasing the batch size larger percentages of catalyst can be used to prepare cellulose esters of a certain viscosity than has been possible heretofore which results in a less time cycle and a more uniform esterification. For instance, amounts of sulfuric acid catalyst of 10% to 12% and even up to 15%, based on the weight of the cellulose, may be employed to promote the esterification of cellulose in accordance with our invention. If desired, smaller proportions of catalyst as employed heretofore (such as 3-7%) may be employed, but the advantages of our invention are best utilized with the 10-15% proportions of sulfuric acid.

Ordinarily, it is desirable to first activate the cellulose, which activation may be carried out either in the esterification mixer by mixing the cellulose with acetic acid or acetic acid and catalyst or the cellulose may be activated independently and added to the mixer for the esterification proper. If pretreatment in the mixer is employed, the use of a mixture of acetic acid and sulfuric acid is preferred due to its rapid pretreating action. If activation of the cellulose outside the mixer is desired, it may be activated as described in Hincke and Richter application, Serial No. 609,044, now Patent No. 2,490,754, or as described in Richter and MacClaren applications, Serial Nos. 657,346, now Patent No. 2,487,892, and 657,347, now Patent No. 2,478,425.

Our invention is particularly useful in processes for the preparation of the lower fatty acid esters of cellulose, whether acetic anhydride, butyric anhydride, or propionic anhydride (or a mixture of any of these) is employed as the esterifying reagent. The esters prepared thereby may be simple esters, such as cellulose acetate, cellulose propionate, or cellulose butyrate, or mixed esters, such as cellulose acetate propionate or cellulose acetate butyrate. The esters prepared may be of low viscosity, such as obtained by permitting the reaction temperature to reach a maximum of 120-130° F., of high viscosity, such as obtained by limiting the maximum reaction temperature to 80-90° F. or of medium viscosity obtained by allowing the reaction temperature to reach a maximum between 90 and 120° F.

The esterification processes in which we have found our invention to be particularly useful are those in which the esterification bath essentially consists of a lower fatty acid anhydride, a lower fatty acid and an acylation catalyst. Our invention, however, is also useful in esterification processes in which other liquids having a solvent action are present, such as ethylene chloride as described in U. S. Patent No. 1,866,971, of Gray and Staud. Our invention is to be understood as being limited to esterification processes in which the cellulose upon esterification dissolves in the esterification liquid known as "dope" esterification processes. The cooling liquid employed for running through the jacket and the mixer blades may be any inert liquid which does not solidify at the temperature used, such as brine, aqueous glycerine, alcohol, aqueous alcohol, or the like.

The following examples illustrate our invention:

*Example 1.*—In a Werner-Pfleiderer type acetylation mixer having cooled mixer blades was placed 600 pounds of cotton linters and 1400 pounds of acetic acid containing 200 cc. of sulfuric acid. The mixer was run for one-half hour, maintaining a temperature therein of 90° F. by circulation of liquid in the water jacket of that temperature. The mixer was then cooled to 70° F., and there was added thereto a mixture of 1600 pounds of acetic acid and 400 pounds of 97% acetic anhydride. After the materials were thoroughly mixed together, there was then added to the mixer 1160 pounds of acetic anhydride, and the cooling was continued down to 50° F. A mixture of 120 pounds of acetic acid and 1760 cc. of sulfuric acid were then added and full cooling was applied through the jacket and mixer blades by circulating cooling liquid having a temperature of 30° F. therethrough. In about a half hour the esterification reached a point where sufficient cellulose had dissolved that the mass adhered to the sides of the mixer on the walls above the point where the mixer blades contacted. The temperature of the mixture at this point was 90° F. The circulation of the cooling liquid at 30° F. was continued through the mixer blades, but water at a temperature of 100° F. was circulated through the jacket of the mixer. About one-half hour later a brilliant uniformly esterified dope was obtained. The reaction was continued until the desired viscosity was reached. For instance, if a tetrachlorethane viscosity of 200 is desired, the reaction is continued for one hour. If a 100 viscosity is desired, an additional forty-five minutes is employed. After the esterification reaction was over and while the viscosity was being adjusted, water having a temperature of 100° F. was passed through the mixer blades. Thereupon 1000 pounds of aqueous acetic acid (66%) containing 1900 g. of magnesium carbonate were added and mixed into the mass. The mass was hydrolyzed by allowing to stand at 100° F. until the desired acetyl content was obtained.

*Example 2.*—There was added to the acetylation mixer, as illustrated by Figure 1 of the drawings, 900 pounds of cotton linters, 2100 pounds of acetic acid, and 600 cc. of sulfuric acid. 90° F. water was run through both the mixer blades and the jacket. After one hour there was added to the mass a mixture of 1560 pounds of acetic acid and 600 pounds of acetic anhydride. Cooling liquid of 45° F. was run through the jacket and the mixer blades, and after about one-half hour the temperature of the esterification mass had dropped to 70° F. At this point 1740 pounds of acetic anhydride were added, and the temperature of the cooling liquid being circulated was dropped to 20° F. When the temperature of the mass had reached 40° F., there was added thereto a mixture of 300 pounds of acetic acid and 26 liters of sulfuric acid. After about one-half hour the esterification had reached the point when adherence of the mass to the sides of the mixer starts to take place. At this point water having a temperature of 100° F. was circulated through the portion of the jacket in contact with the mixer walls where the adherence occurs, while the cooling liquid continued to circulate through the mixer blades and the bottom jacket of the mixer. This mixing was continued for one hour whereupon there was added to the mass a mixture of 750 pounds of distilled water, 1800 pounds of acetic acid, and 60 pounds of magnesium carbonate. Water at 100° F. was circulated through the jackets and the mixer blades so as to bring the temperature of the esterification mass to 100° F. The mass was then transferred to another vessel and allowed to stand at 100° F. until the desired hydrolysis had occurred.

*Example 3.*—One-thousand pounds of refined cotton linters were mixed in an esterification mixer with 770 pounds of glacial acetic acid for one hour at 120° F. The esterification mixer employed was of the Werner-Pfleiderer type with sigma-shaped mixer blades having a pipe running therethrough for cooling purposes and otherwise as illustrated in Figure I. 4000 pounds of butyric anhydride were then mixed into the mass, and liquid having a temperature of 20° F. was run through both the mixer blades and the jacket of the mixer. When the temperature of the mass had come down to 50° F., a mixture of 50 pounds of acetic acid and 50 pounds of sulfuric acid which had been cooled to 50° F. was added to the mass and thoroughly mixed therein. After the cellulose ester started to go in solution, which was after about three hours, warm water was passed through the upper jacket of the esterification mixer. The total time of reaction was five hours, the maximum temperature being 80–85° F. Dilute aqueous acetic acid was then added to the mass, and water having a temperature of 100° F. was run through both the jackets of the mixer and through the mixer blades until the mass had this temperature. The mass was allowed to stand for about fifty hours at the 100° F. temperature and was then precipitated, washed, and dried to obtain a cellulose acetate butyrate having a butyryl content of 37% and acetyl content of 13%.

We claim:

1. A process for preparing lower fatty acid esters of cellulose which comprises mixing cellulose and an esterification mixture essentially consisting of lower fatty acid anhydride, acylation catalyst, and a solvent, in an esterification mixer while the mixer blades and walls are cooled, until the cellulose starts to go into solution, then while continuing the mixing with the cooled mixer blades imparting to the walls of the mixer contacted by the cellulose ester solution, a temperature of 80–130° F. until the esterification is completed.

2. A process for preparing lower fatty acid esters of cellulose which comprises mixing cellulose and an esterification mixture essentially consisting of lower fatty acid anhydride, acylation catalyst and a solvent, in an esterification mixer provided with cooled mixer blades and a jacket separated exterior the point where the wiping action of the mixer blades on the walls of the mixer ends, cooling liquid being passed through the separated portions of the jacket until the cellulose starts to dissolve, then while continuing the mixing with the cooled mixer blades passing through the jacket portion adjacent the walls contacting the esterification mass warm liquid until the esterification step is completed.

3. A process for preparing lower fatty acid esters of cellulose which comprises mixing cellulose and an esterification mixture essentially consisting of lower fatty acid anhydride, acylation catalyst and a solvent, in an esterification mixer provided with cooled mixer blades and a unitary jacket, cooling liquid being passed through the jacket until the cellulose starts to dissolve, then while continuing the mixing with the cooled mixer blades passing through the jacket, warm liquid until the esterification step is completed.

4. A process for preparing lower fatty acid esters of cellulose which comprises mixing cellulose and an esterification mixture essentially consisting of lower fatty acid anhydride, 10–15% (based on the cellulose) of sulfuric acid catalyst and a solvent, in an esterification mixer while the blades and the walls thereof are cooled, until the cellulose starts to go into solution, then while continuing the mixing with the cooled mixer blades imparting to the walls of the mixer contacted by the cellulose ester solution a temperature of 80–130° F. until the esterification is completed.

5. A process for preparing lower fatty acid esters of cellulose which comprises mixing cellulose and an esterification mixture essentially consisting of lower fatty acid anhydride, acylation catalyst and a solvent, in an esterification mixer while the blades and the walls thereof are cooled sufficiently that the maximum temperature reached by the mass is 80–90° F., then while continuing the mixing with the cooled mixer blades imparting to the walls of the mixer contacted by the mass a temperature of 60–90° F. until the esterification is completed.

6. A process for preparing cellulose acetate which comprises mixing cellulose and an esterification mixture essentially consisting of acetic anhydride, acylation catalyst and acetic acid, in an esterification mixer while the mixer blades and walls thereof are cooled, until the cellulose starts to go into solution, then while continuing the mixing with the cooled mixer blades imparting to the walls of the mixer contacting the cellulose acetate solution, a temperature of 80–130° F. until the esterification is completed.

7. A process for preparing cellulose acetate butyrate which comprises mixing cellulose and an esterification mixture essentially consisting of butyric anhydride, acetic acid and an acylation catalyst in an esterification mixer while the mixer blades and walls thereof are cooled until the cellulose starts to go into solution, then while continuing the mixing with the cooled mixer blades imparting to the walls of the mixer contacting the cellulose ester solution, a temperature of 80–130° F. until the esterification is completed.

8. A process for preparing cellulose acetate which comprises mixing cellulose and an esterification mixture essentially consisting of acetic anhydride, acetic acid and 10–15% (based on the cellulose) of sulfuric acid catalyst, in an esterification mixer while the mixer blades and walls thereof are cooled, until the cellulose starts to go into solution, then while continuing the mixing with the cooled mixer blades imparting to the walls of the mixer contacting the cellulose acetate solution, a temperature of 80–130° F. until the esterification is completed.

9. A process for preparing cellulose acetate butyrate which comprises mixing in an esterification mixer while the mixer blades and walls are cooled, 1000 parts of cellulose with an esterification mixture essentially consisting of 4000 parts of butyric anhydride, 820 parts of acetic acid and an acylation catalyst, until the cellulose starts to go into solution, then while continuing the mixing with the cooled mixer blades imparting to the walls of the mixer contacting the cellulose ester solution, a temperature of 80–90° F. until the esterification is completed.

WILLIAM B. HINCKE.
CARL J. MALM.

REFERENCES CITED

The following references are of record in the file of this patent:

UNITED STATES PATENTS

| Number | Name | Date |
|---|---|---|
| 811,145 | Higgins | Jan. 30, 1906 |
| 1,166,139 | Marwedel | Dec. 28, 1915 |
| 1,829,822 | Dreyfus | Nov. 3, 1931 |
| 1,854,732 | Beran | Apr. 19, 1932 |
| 2,111,010 | Sochor | Mar. 15, 1938 |
| 2,122,173 | Brown | June 28, 1938 |
| 2,345,406 | Malm | Mar. 28, 1944 |